(12) United States Patent
Pham et al.

(10) Patent No.: US 10,839,066 B1
(45) Date of Patent: Nov. 17, 2020

(54) DISTINGUISHING HUMAN FROM MACHINE INPUT USING AN ANIMATION

(71) Applicant: Capital One Services, LLC, McLean, VA (US)

(72) Inventors: Vincent Pham, Champaign, IL (US); Austin Walters, Savoy, IL (US); Jeremy Goodsitt, Champaign, IL (US); Fardin Abdi Tagh Abad, Champaign, IL (US); Reza Farivar, Champaign, IL (US); Mark Watson, Urbana, IL (US); Anh Truong, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/694,776

(22) Filed: Nov. 25, 2019

(51) Int. Cl.
*G06F 21/36* (2013.01)
*G06F 21/40* (2013.01)
*G06T 13/80* (2011.01)

(52) U.S. Cl.
CPC .............. *G06F 21/36* (2013.01); *G06F 21/40* (2013.01); *G06T 13/80* (2013.01); *G06F 2221/2103* (2013.01); *G06F 2221/2133* (2013.01)

(58) Field of Classification Search
CPC .............. G06F 21/36; G06F 2221/2103; G06F 2221/2133; G06F 21/40; G06T 13/80
See application file for complete search history.

(56) References Cited

U.S. PATENT DOCUMENTS

| | | | | |
|---|---|---|---|---|
| 2008/0127302 A1* | 5/2008 | Qvarfordt | ............... | G06F 21/36 726/2 |
| 2009/0150983 A1* | 6/2009 | Saxena | ................... | G06F 21/36 726/7 |
| 2009/0187986 A1* | 7/2009 | Ozeki | ..................... | G06F 21/36 726/21 |
| 2013/0276125 A1* | 10/2013 | Bailey | ..................... | G06F 21/46 726/25 |
| 2014/0196133 A1* | 7/2014 | Shuster | ................. | G06F 21/316 726/7 |
| 2015/0143495 A1* | 5/2015 | Okada | ..................... | G06F 21/31 726/7 |
| 2015/0317700 A1* | 11/2015 | Ford | .................. | G06Q 30/0277 705/71 |
| 2016/0044025 A1* | 2/2016 | Goyal | ................. | H04L 63/1483 726/6 |
| 2016/0300054 A1* | 10/2016 | Turgeman | ............... | G06F 3/017 |
| 2019/0073637 A1* | 3/2019 | Madhey | ................. | G06Q 10/06 |

* cited by examiner

*Primary Examiner* — Jayesh M Jhaveri
(74) *Attorney, Agent, or Firm* — Harrity & Harrity, LLP

(57) ABSTRACT

A device may obtain an animation, wherein the animation comprises a set of frames to emulate a moving image. The device may obtain a label to associate with the animation. The device may generate a human authentication challenge, wherein the human authentication challenge includes a display using the animation, and directions for a user to complete a task by interpreting the animation. The device may generate instructions to cause a user device to display the human authentication challenge. The device may send, to the user device, the instructions to cause the user device to display the human authentication challenge. The device may receive an input to the human authentication challenge regarding the animation. The device may analyze the input using the label to determine whether to authenticate the user. The device may perform an action based on analyzing the input using the label to determine whether to authenticate the user.

20 Claims, 11 Drawing Sheets

DISTINGUISHING HUMAN FROM MACHINE INPUT USING AN ANIMATION

BACKGROUND

Challenge-response authentication may be used as a security measure in determining whether to permit access to a web service by helping distinguish human input from potentially harmful automated input. Some challenge-response authentication techniques, known as Completely Automated Public Turing tests to tell Computers and Humans Apart (CAPTCHAs), may direct the user to perform a task, where successful completion of the task indicates human input. These techniques may help prevent automated services from engaging in abusive activity on the web service.

SUMMARY

According to some implementations, a method may include obtaining, by a device, an animation, wherein the animation comprises a set of frames organized sequentially to emulate a moving image; obtaining, by the device, a label to associate with the animation; generating, by the device, a human authentication challenge, wherein the human authentication challenge includes: a visual display using the animation, and directions for a user to complete a task by interpreting the animation, wherein correctly interpreting the animation depends on evaluating multiple frames in a particular sequence in the animation; generating, by the device, instructions to cause a user device to display the human authentication challenge; sending, by the device and to the user device, the instructions to cause the user device to display the human authentication challenge; receiving, by the device and from the user device, an input to the human authentication challenge regarding the animation; analyzing, by the device, the input using the label to determine whether to authenticate the user; and performing, by the device, an action based on analyzing the input using the label to determine whether to authenticate the user.

According to some implementations, a device may include one or more memories; and one or more processors, communicatively coupled to the one or more memories, configured to: obtain a first animation, wherein the first animation comprises a set of frames organized sequentially to emulate movement; generate a second animation based on manipulating the set of frames of the first animation to create a different style animation; obtain a label to associate with the second animation; generate a human authentication challenge, wherein the human authentication challenge includes: a visual display using the second animation, and directions for a user to complete a task by interpreting the second animation, wherein correctly interpreting the second animation depends on evaluating multiple frames in a particular sequence in the second animation; generate instructions to cause a user device to display the human authentication challenge; send, to the user device, the instructions to cause the user device to display the human authentication challenge; receive, from the user device, an input to the human authentication challenge regarding the second animation; analyze the input using the label to determine whether to authenticate the user; and perform an action based on analyzing the input using the label to determine whether to authenticate the user.

According to some implementations, a non-transitory computer-readable medium may store one or more instructions. The one or more instructions, when executed by one or more processors of a device, may cause the one or more processors to: obtain a first animation, wherein the first animation comprises a series of images that simulates movement; generate a second animation based on manipulating the series of images of the first animation to create a different animation; obtain a label to associate with the second animation; generate a human authentication challenge, wherein the human authentication challenge includes: a visual display using the second animation, and directions for a user to complete a task by interpreting the second animation, wherein correctly interpreting the second animation depends on evaluating multiple images in a particular sequence in the second animation; generate instructions to cause a user device to display the human authentication challenge; send, to the user device, the instructions to cause the user device to display the human authentication challenge; receive, from the user device, an input to the human authentication challenge regarding the second animation; analyze the input using the label to determine whether to authenticate the user; and perform an action based on analyzing the input using the label to determine whether to authenticate the user.

DETAILED DESCRIPTION

Figure 1A:
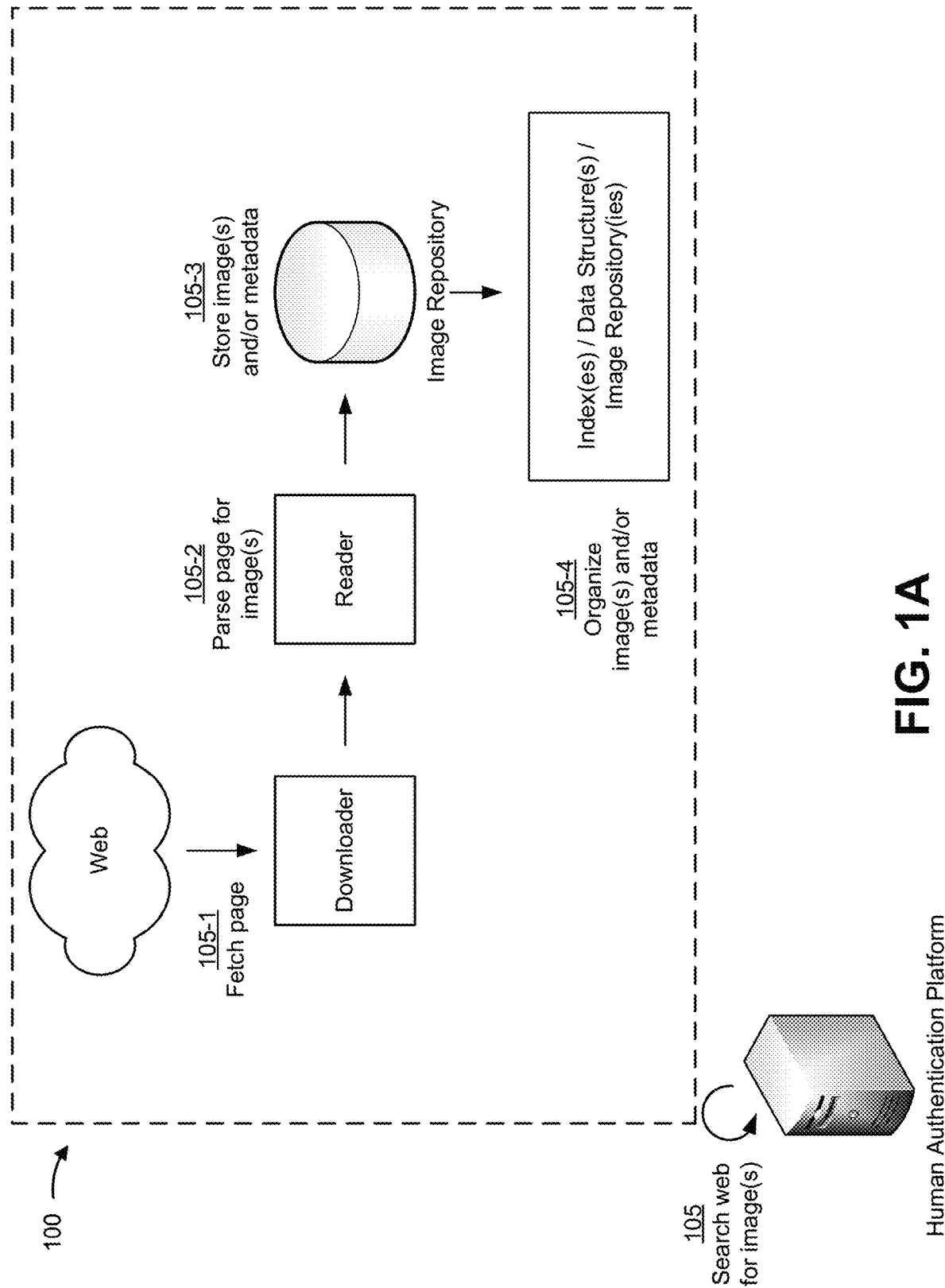
FIGS. 1A-1F are diagrams of one or more example implementations described herein.

The following detailed description of example implementations refers to the accompanying drawings. The same reference numbers in different drawings may identify the same or similar elements.

A web user typically wants to protect personal data that the web user uploads to the web. While this personal data is typically protected by a layer of security (such as passwords), malicious automated programs may be able to breach the layer of security. For example, an automated program, or "bot," may use a brute-force algorithm to repeatedly generate and submit passwords until the correct one is submitted to gain authentication and access to the personal data. This security concern is not limited to web users, but a variety of people who use web services or applications, such as web administrators that manage the web services, developers who try to create secure applications, and/or the like. In addition, attacks are not just limited to cracking passwords. Instead, automated attacks may disrupt web services or applications through a variety of ways, such as by overwhelming a server through numerous attempts to access a web page, submitting unsolicited messages or other unwanted content (e.g., creating fake email accounts), and/or the like.

To thwart these bots, some web services or applications use challenges that a user must successfully complete to access the web services or applications. These challenges are commonly referred to as Completely Automated Public Turing tests to tell Computers and Humans Apart, or CAPTCHAs. Developers face challenges in designing CAPTCHAs that humans may universally complete with little to no problem, but that are difficult for bots to complete. One area in which developers have sought to exploit a "human" advantage is the visual processing field. For example, a common CAPTCHA used is an image-based CAPTCHA, which contains an array of different images, and asks the user to select only those images that pertain to a particular object (e.g., "select all images that contain a 'stop sign'").

However, innovations in artificial intelligence, such as advances in machine learning, an increased availability of advanced hardware, and an availability of big data, have enabled bots to complete image-based CAPTCHAs more and more accurately. Through training through large datasets of photos, bots may now visually process data and solve image-based CAPTCHAs with accuracies sometimes even surpassing humans. As a result, the bots may bypass security measures intended to prevent access by unwanted web users, such as the bots. In turn, obtaining access allows the bots to engage in malicious acts that harm the web services or applications. Malicious acts may include compromising private data, disrupting a computer system, and/or the like. The problem is pervasive across different image-based CAPTCHAs that rely on visual processing. For example, using machine-learned techniques or character segmentation models, bots may now break or solve text-based CAPTCHAs, which may challenge a user to recognize a word formed through different fonts and/or styles. These technological advances diminish the ability of current CAPTCHAs in preventing bot access.

When bots gain unauthorized access to web services or applications by breaking image-based and/or text-based CAPTCHAs, computing resources (e.g., processing resources, memory resources, communication resources, and/or the like) and/or network resources are wasted by an entity associated with the web services or applications. For example, computing resources and/or network resources are wasted in identifying the unauthorized access, in investigating the unauthorized access, in remediating damage caused by the unauthorized access, and/or the like.

Some implementations described herein provide a human authentication platform which obtains an animation and generates a task which requires a correct interpretation of the animation to distinguish human from machine input. For example, the human authentication platform may generate a human authentication challenge which causes a user device to display the animation and ask the user to specify an action shown based on the animation (e.g., showing an animation of a girl shooting a basketball and then asking the user "What is the girl doing?"), or predict an action that is not shown based on the animation (e.g., showing an animation of a glass bottle dropping just before hitting the ground and then asking the user, "What happens to the glass bottle?"). In some implementations, the animation may be stylized in a non-realistic or semi-realistic fashion, such as a cartoon.

In this way, bots which have been trained on static, real images may have difficulty completing the human authentication challenge. Because bots may train with real images, or photos, but lack training with non-realistic or semi-realistic images, the various styles of non-realistic or semi-realistic frames in the animation may thwart a bot from correctly identifying an object in the images. Additionally, the bot, while potentially being able to identify the object of the images, may have difficulty interpreting an action in the animation that relies on processing the frames of the animation together. That is, even the bots that can successfully process a static image to determine the object of the static image may be unable to process an action, meaning, and/or the like by determining how multiple images in sequence create the action, meaning, and/or the like to a human. For example, in the previous "glass bottle" challenge, while the bot may be able to identify a glass bottle in an animation of a glass bottle dropping just before hitting the ground, the bot may be unable to interpret what would follow realistically from the animation (e.g., the glass bottle shattering).

In this way, security associated with a web service or application may improve, as harmful attacks propagated by malicious actors may be reduced or mitigated because of the failure of the bot to complete the human authentication challenge. In turn, this may conserve computing resources (e.g., processor resources, memory resources, communication resources, and/or the like) that would otherwise be wasted in identifying a security breach, such as identifying what parts of the web service or application were affected by the security breach and what caused the security breach. For example, computing resources that may otherwise have been used in executing additional processes to identify a cause of the security breach may no longer be used, because of the reduction or elimination of security breaches. Additionally, or alternatively, some implementations described herein may conserve computing resources that would otherwise be used in remediating the security breaches. For example, memory resources that would otherwise have been used in recovering data, processing resources that would otherwise have been used in updating a computer system associated with a web service or application because of the security breaches, and/or the like may be conserved because of a reduction in security breaches.

FIGS. 1A-1F are diagrams of one or more example implementations 100 described herein. As shown in FIGS. 1A-1F, example implementation(s) 100 may include a human authentication platform that interacts with a user device. The human authentication platform may interact with the user device to generate, send, and receive information relating to a human authentication challenge. While the human authentication platform is shown as interacting with a single user device, in practice, the human authentication platform may interact with a plurality of user devices, such as tens, hundreds, thousands, or more of user devices.

As shown in FIG. 1A, and by reference number 105, a human authentication platform may search a network, such as the Internet (e.g., the web), for images. The human authentication platform may use a variety of techniques, such as web crawling, web scraping, and/or the like to search for images. In this way, the human authentication platform may begin a process of generating a human authentication challenge by finding suitable images to display for the human authentication challenge. The images may include static images, dynamic images (e.g., animations), 3D images, realistic images (e.g., photos), stylized images (e.g., cartoons), and/or the like.

In some implementations, the human authentication platform may use a web crawling technique to search for the images. As shown in FIG. 1A, and by reference number 105-1, the human authentication platform (e.g., using a downloader) may fetch a page from the web. The human authentication platform may fetch the page by executing instructions that provides explicit identifying information of the page, such identifying the page by a web address, identifier, location, and/or the like. Additionally, or alternatively, the human authentication platform may use non-explicit identifying information of the page, such as information that does not identify the page directly, but still causes the human authentication platform to identify and fetch the page. For example, the human authentication platform may fetch the page as a result of being redirected from another page.

In some implementations, the page may be one of a plurality of pages the human authentication platform is instructed to fetch. For example, the human authentication platform may fetch the page from a list of a plurality of pages in a queue of explicitly identified pages (e.g., a list of web addresses, identifiers, locations, and/or the like). Additionally, or alternatively, the human authentication platform may supplement the list of the plurality of pages to fetch while fetching the page. For example, the human authentication platform may use information from the fetched page to identify additional pages to fetch and add the additional pages to the queue of pages (e.g., by using links to the additional pages present on the fetched page). In this way, the human authentication platform may search a particular set of pages, a minimized or expansive set of pages, and/or the like, depending on how the search scope is defined.

As shown in FIG. 1A, and by reference number 105-2, the human authentication platform (e.g., using a reader) may parse the page for images. The human authentication platform may use various techniques to identify images on the page. In some implementations, an image on the page may be associated with metadata. The metadata may include details relevant to the image. For example, the metadata may indicate technical metadata, such as a date and time the image was created, a location where the image was created, a resolution of the image, a format of the image (e.g., JPEG, GIF, PNG, and/or the like), and/or the like. Additionally, or alternatively, the metadata may include descriptive metadata, such as a file name for the image, a name of an image creator for the image, a keyword related to the image, a caption related to the image, text near the image on the page, and/or the like. In some implementations, the metadata may include information on licensing, usage, restrictions on reuse, contact information for the owner of the image, and/or the like. The metadata may be embedded with a file associated with the image, present in website code near the image on the page, and/or the like.

In some implementations, the human authentication platform may search for a particular structure or line of code in a page code to identify the image and/or the metadata associated with the image. For example, the human authentication platform may parse HTML code associated with the page for a particular HTML, structure that indicates an image. In some implementations, the human authentication platform may parse the page for additional information regarding the image. For example, the human authentication platform may parse the page for a particular string of code that indicate that images on the page are available to use (e.g., copyright-free images).

Additionally, or alternatively, the human authentication platform may alter a search scope of images by searching for particular criteria. In this way, the human authentication platform may filter out unwanted images or images that do not fulfill the particular criteria. For example, the human authentication platform may search for a particular type of image as indicated through metadata of the image. A type of image may be defined by different characteristics, such as by a format of the image (e.g., JPEG, GIF, PNG, and/or the like), a size of the image (e.g., how much space the image takes up on electronic storage), an aspect ratio of the image, a resolution of the image, and/or the like. The human authentication platform may search for different characteristics in the metadata by searching for a particular structure or string of code to identify a particular type of image. For example, to search for an animated image, as opposed to a static image, the human authentication platform may search for a file extension in the metadata that is associated with animations (e.g., GIF, MPEG, and/or the like), a caption or tag in the metadata that is associated with animations (e.g., "an animation of a car," "a moving cartoon car," and/or the like), and/or the like. By filtering the images, the human authentication platform conserves computing resources (e.g., processor resources, memory resources, and/or the like) that would otherwise be used to store and process images that are not proper images to include in a human authentication challenge.

In some implementations, a storage device, server device, and/or the like may contain a database of images. The human authentication platform may obtain the images from the storage device, server device, and/or the like through various methods, such as through a one-time download of the images. The human authentication platform may then obtain additional images or update the database of the images using methods described above in which the human authentication platform searches the web for the images.

As shown in FIG. 1A, and by reference number 105-3, the human authentication platform may store the images and the metadata associated with the images in an image repository. In this way, the human authentication platform may easily retrieve the images and the metadata to generate the human authentication challenge. In some implementations, the human authentication platform may download the images and the metadata and store the images and the metadata in memory accessible by the human authentication platform (e.g., memory of the human authentication platform, memory of a server device accessible by the human authentication platform, and/or the like). Additionally, or alternatively, the human authentication platform may store information associated with the images, such as information identifying where the images are located on the web or in the memory, such as web addresses, identifiers, locations, and/or the like associated with the images.

The human authentication platform may perform other actions to assist with storing the images and/or metadata, such as compressing the images for storage, converting image formats for storage, filtering images, and/or the like. In some implementations, the human authentication platform may process an image to determine one or more subjects or objects of the image. For example, the human authentication platform may perform image processing techniques, such as performing object recognition, object detection, image segmentation, and/or the like to determine one or more subjects or objects in the image. The human authentication platform may be able to identify a main object, a background object, a background, and/or the like. In some implementations, the human authentication platform may be able to identify an action occurring in the image. For example, the human authentication platform may use artificial intelligence techniques, such as using a long short-term memory (LSTM) neural network model, a recurrent neural network model, and/or the like on the images and existing label data to predict labels for the images. Based on determining the one or more subjects or objects in the image and/or identifying the action in the image, the human authentication platform may generate additional metadata to associate with the image. For example, the human authentication platform may generate additional tags, keywords, and/or the like to associate with the image.

As shown in FIG. 1A, and by reference number 105-4, the human authentication platform may organize the images and the metadata in an index. The index may include links, identifiers, or other locative aids to allow devices to locate the images in a repository, image storage, or other storage location. In this way, the human authentication platform may easily search and access particular types of images. In some implementations, the human authentication platform may arrange the index by keyword. The keyword may be associated with the metadata in the index and relate to a subject, object, action, and/or the like associated with the image. For example, for a keyword "dog," there may be a list of identifiers, locations, web addresses, and/or the like of images related to dogs. In some implementations, the human authentication platform may use multiple indexes to organize the images and the metadata. For example, the human authentication platform may use a static image index for static images and an animation index for dynamic images. Additionally, or alternatively, the human authentication platform may use a high-resolution image index for images of a particular resolution or higher and a low-resolution index for images of a resolution lower than the particular resolution. In some implementations, the human authentication platform may organize the images by tagging the images, creating a list of information for locating the images, and/or the like.

The methods identified above are intended merely as examples of how to collect and store images and how to generate an index of metadata associated with the images. In practice, different methods or techniques may be used in addition to, or instead of, the methods identified above. For example, other methods may include obtaining the images and/or the metadata from local storage, a repository, and/or the like. Additionally, or alternatively, while the human authentication platform has been described as the device that collects the images, stores the images, and generates the index, this need not be the case. In some implementations, a server device or a collection of server devices may collect the images, store the images, and/or generate the index for use by the human authentication platform.

Figure 1B:
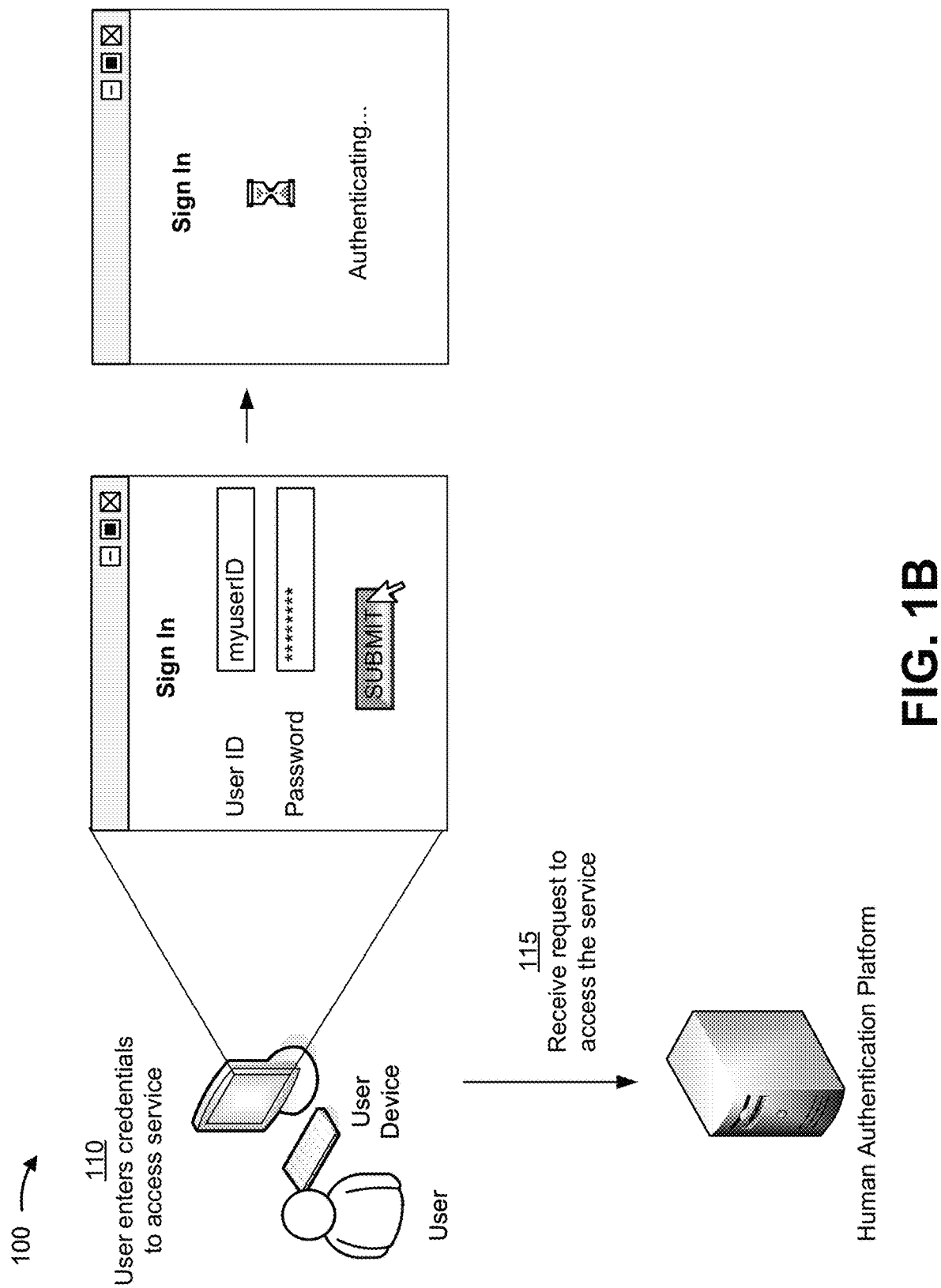

As shown in FIG. 1B, and by reference number 110, a user may enter credentials to access a service. The user may employ a user device, such as a computer, tablet, mobile device, smart device (e.g., a smart television, smart watch, and/or the like), and/or the like, to request access to the service. The service may permit the user device to send and/or receive data to and/or from a server device associated with the service (e.g., uploading data, streaming data, submitting a form, downloading data, accessing data for display, performing a transaction, and/or the like). The user may access the service through a web browser running on the user device. In some implementations, the user may enter credentials to access the service, such as entering a user identifier (ID), password, and/or the like. Additionally, or alternatively, the user may attempt to access the service without entering credentials. For example, the user may attempt to access the service by clicking on a link to a page. While the description herein focuses on the user attempting to access a service, the description equally applies to the user attempting to access an application or another form of content.

When the user enters the credentials to access the service via the user device, the user device transmits a request to access the service to the server device associated with the service. The server device may receive the request and may selectively redirect the request to the human authentication platform. In some implementations, the server device may be configured to always redirect requests to access the service to the human authentication platform. In some implementations, the server device may be configured to determine whether to redirect a request to access the service to the human authentication platform based on one or more factors described below in the context of the human authentication platform determining whether to perform an additional security measure.

As shown in FIG. 1B, and by reference number 115, the human authentication platform may receive the request to access the service. The human authentication platform may determine that an additional security measure is needed before allowing the user access to the service. For example, the human authentication platform may determine that a human authentication challenge is required to distinguish human input from machine (e.g., an automated computing program) input. In this way, the human authentication platform may prevent unwanted access by automated programs that target the service for malicious acts (e.g., sending unsolicited input to the service, obtaining private data from the service, disrupting a computer system associated with the service, and/or the like).

In some implementations, the human authentication platform may be configured to always require the human authentication challenge. In some implementations, the human authentication platform may determine that the human authentication challenge is needed based on different user characteristics. For example, the human authentication platform may determine that the human authentication challenge is required based on what service the user is attempting to access, based on whether the user is a recognized user (e.g., a regular user), and/or the like. In some implementations, the human authentication platform may determine that the human authentication challenge is needed based on a count or timing information related to the request. For example, the human authentication platform may determine that the human authentication challenge is required for a request from the user based on the day/time or a last log-in by the user, based on whether the user has attempted to access the service in a month, based on a number of the request (e.g., the human authentication challenge is required for every third request) to access the website hosted by the server device, based on the request to access the service being received during a particular time period (e.g., 9 AM to 5 PM), and/or the like. In some implementations, the human authentication challenge may be required based on a number of times the user device attempts to access the service. Additionally, or alternatively, the human authentication platform may determine that the human authentication challenge is needed based on random selection, such as at random time intervals throughout the day, choosing an attempt at random, and/or the like.

In some implementations, the human authentication platform may obtain additional information from the user device indicating a type of user device, a type of browser used to access the service, and/or the like. The human authentication platform may use the additional information to determine whether the human authentication challenge is required. For example, the human authentication platform may determine that the human authentication challenge is required based on the additional information detecting a mobile device is being used, based on receiving a request from an untrusted device, based on receiving a request from a new device (e.g., a device that has not previously been associated with the user), and/or the like.

In some implementations, the human authentication platform may use artificial intelligence techniques, such as machine learning, deep learning, and/or the like to determine that the human authentication challenge is needed. For example, the human authentication platform may use a machine learning model, such as a human authentication model, to determine that the human authentication challenge is needed. For example, the human authentication platform may train the human authentication model to identify particular characteristics of user access (e.g., user characteristics) that share attributes with particular authentication outcomes (e.g., legitimate user, illegitimate user, and/or the like) and establish a cluster (e.g., using a mapping, index, and/or the like) of the particular user characteristics. The human authentication platform may use a clustering algorithm (e.g., a K-means clustering algorithm, a hierarchical clustering algorithm, a density-based scan clustering with noise (DBSCAN) algorithm, a Gaussian clustering model, etc.), or a combination of different clustering algorithms to form the user characteristics clusters. The human authentication platform may train the human authentication model using historical data associated with historical access data. For example, the machine learning model may be trained based on historical user access data (e.g., the user characteristics) and authentication outcomes and the trained model may then be used to determine whether to require the human authentication challenge based on the characteristics of the user attempt to access the service.

In some implementations, the human authentication platform may determine that the human authentication challenge is required based on analyzing a combination of user characteristics. In some implementations, the human authentication platform may determine a security risk score that satisfies a threshold. The human authentication platform may identify a variety of user characteristics, assign weights to likely outcomes of the user characteristics, create an overall security risk score based on the weights, and determine whether to require the human authentication challenge based on whether the security risk score satisfies the threshold. In some implementations, the trained model may be used to determine the security risk score.

Figure 1C:
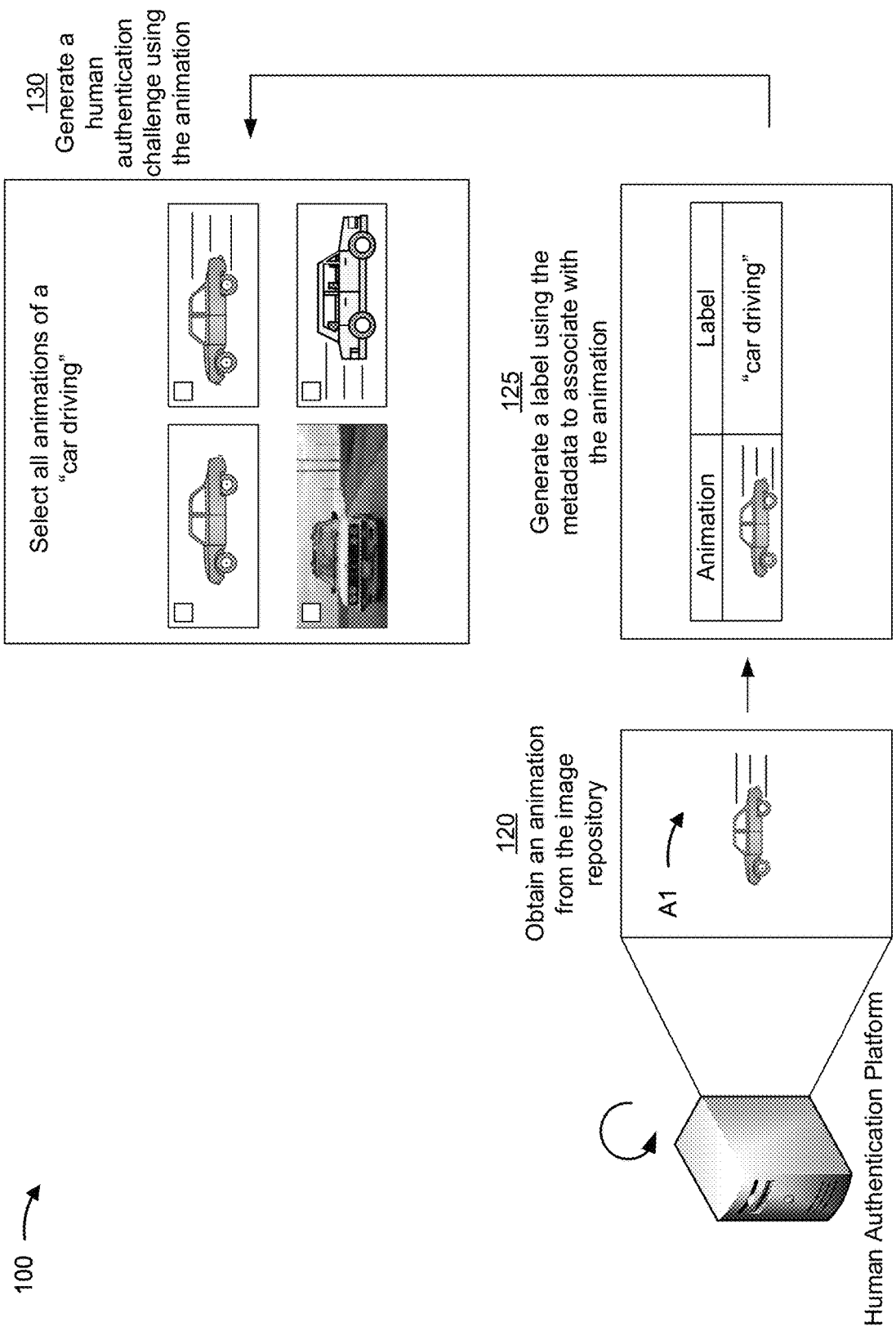

As shown in FIG. 1C, and by reference number 120, the human authentication platform may obtain an animation from the image repository. Assume that the human authentication platform determines that the human authentication challenge is needed, as described above. As a result, the human authentication platform may begin generating a human authentication challenge using the animation obtained from the image repository. In some implementations, the human authentication platform may search for an animation by searching for a particular file type (e.g., GIF, MNG, APNG, and/or the like) typically associated with an animation or dynamic image. In some implementations, the human authentication platform may randomly select the animation, irrelevant of criteria. For example, the human authentication platform may select the animation using a random algorithm, a random selection tool, and/or the like. Additionally, or alternatively, the human authentication platform may obtain the particular animation based on particular factors. For example, the human authentication platform may obtain an animation that has not previously been used in a human authentication challenge, an animation that has been used in a human authentication challenge, an animation that has been used in a human authentication challenge based on time criteria (e.g., has not been used in 30 days, has been used in 30 days, and/or the like), and/or the like.

In some implementations, the human authentication platform may obtain the animation by searching the index for particular metadata or keywords. In some implementations, the human authentication platform may obtain the animation by searching a particular index based on a type of user device. For example, the human authentication platform may obtain a low-resolution animation by searching a low-resolution index based on detecting that the user device is a mobile device, a high-resolution animation by searching a high-resolution index based on detecting that the user device is a computer, and/or the like.

The human authentication platform may read the metadata associated with the animation. As described above, the metadata may have been generated from information embedded in the image itself, information inputted by a user, information from additional files associated with the image, information from a caption associated with the image, information from a webpage that includes the image, a combination of different information, and/or the like. The metadata may include one or more keywords that describe the image, such as describing a subject of the image, an object of the image, an action occurring in the image, a combination of the foregoing elements, and/or the like. For example, the human authentication platform may read the metadata associated with an animation of a dog running to be "dog," "running," "running dog," "dog running," and/or the like.

As shown in FIG. 1C, and by reference number 125, the human authentication platform may generate a label to associate with the animation. In some implementations, the human authentication platform may generate the label by reading the metadata from memory, such as the image repository or the index. The human authentication platform may use the metadata associated with the animation to generate the label. The label may be a string of text, a word, multiple words, and/or the like. The label may describe a subject or object of the image (e.g., "dog," "car," and/or the like), a verb or action associated with the image ("running," "falling," and/or the like), a combination of the subject and the action, and/or the like.

In some implementations, the human authentication platform may obtain zero or more other images with particular metadata. For example, the human authentication platform may obtain similar or matching metadata to the label associated with the animation. For example, the human authentication platform may search the index for other animations, other animations with similar metadata or keywords, and/or the like. In some implementations, the human authentication platform may obtain one or more other images with dissimilar or non-matching metadata. For example, the human authentication platform may search the index for static images or other animations with dissimilar or non-matching metadata or keywords. In some implementations, the human authentication platform may obtain the other images randomly, such as through random selection.

As shown in FIG. 1C, and by reference number 130, the human authentication platform may generate a human authentication challenge using the animation. The human authentication challenge may be designed to allow humans to easily complete the challenge correctly, but be difficult for machines, or automated programs to complete the challenge correctly. In this way, the human authentication challenge may distinguish human input from machine input. The human authentication challenge may include a display of the animation and instruct the user to complete a task by interpreting the animation. The human authentication challenge may require a correct interpretation of the animation, particularly interpreting the multiple frames, images, and/or the like of the animation in sequence, to complete the human authentication challenge correctly. The human authentication platform may use the label to generate the human authentication challenge or create a correct "answer" for the human authentication challenge. In some implementations, the human authentication platform may generate an answer key using the animation and/or the label. For example, in a human authentication challenge where a user has to input a string of text interpreting the animation, the string of text may be required to match the label to constitute a correct answer. In some implementations, user input may be required to match the label partially, fully, and/or the like.

The human authentication platform may generate different types of human authentication challenges that cause the user to interpret the animation. In some implementations, the human authentication challenge may include the animation and an interpretation of an object, subject, action, and/or the like of the animation. For example, the human authentication challenge may cause a user device to display the animation and ask the user to specify an action shown based on the animation (e.g., showing an animation of a girl shooting a basketball and then asking the user "What is the girl doing?"). The user may then input a string of text that describes the action shown in the animation. In some implementations, the animation may be stylized in a non-realistic or semi-realistic fashion, such as a cartoon.

In some implementations, the human authentication platform may instruct the user to complete the task by predicting a next set of frames, images, and/or the like to fit the animation based on interpreting the animation. For example, the task may direct the user to predict an action that is not shown in the animation based on interpreting the animation (e.g., showing an animation of a glass bottle dropping just before hitting the ground and then asking the user, "What happens to the glass bottle?").

In some implementations, the human authentication platform may use a variety of images to create the human authentication challenge. For example, the human authentication platform may use other obtained images (such as images with similar metadata, dissimilar metadata, static images, other animations, and/or the like) and direct the user to correctly select one or more animations from a variety of images shown to the user. In some implementations, the human authentication challenge may use the label and direct the user to correctly select one or more animations from the variety of images that correspond to the label. In some implementations, the human authentication platform may integrate timing into the human authentication challenge. For example, the human authentication platform may use "targeted lag," in which one or more animations in the human authentication challenge load at a particular rate and obtain information from how quickly the user completes the human authentication challenge relative to the loading rate or whether the animation has loaded (e.g., selecting an animation before it has loaded, selecting an animation after it has loaded, and/or the like).

In some implementations, the human authentication platform may determine the type of human authentication challenge based on a level of security risk determined in previous steps. For example, the human authentication platform may generate a human authentication challenge of high difficulty when the level of security risk is high, of low difficulty when the level of security risk is low, and/or the like. In this way, the human authentication platform may conserve computing resources by preserving resource-intensive processes (e.g., creating higher difficulty human authentication challenges) for high level security threats.

In some implementations, the human authentication platform may determine the type of human authentication challenge to show based on a type of user device detected. For example, the human authentication platform may generate a human authentication challenge with an array of images based on detecting that the user device is a computer. In another example, the human authentication platform may determine to show a human authentication challenge with a single image based on detecting that the user device is a mobile device. In this way, the human authentication platform may reduce using computing resources for user devices that may have trouble rendering the human authentication challenge, user devices that are less of a security risk, and/or the like. In some implementations, the human authentication platform may determine to show a second human authentication challenge of a higher difficulty than a difficulty of a first human authentication challenge based on the user failing to complete the first human authentication challenge correctly. The human authentication platform may show progressively more difficult human authentication challenges for a third attempt, fourth attempt, and other consecutive attempts.

In some implementations, the human authentication challenge may include a quantity, count, duration, measure, and/or the like associated with the task. For example, the human authentication challenge may include a time limitation on completing the task, measure the amount of time the user takes to complete the task, and/or the like. In some implementations, the human authentication platform may store the human authentication challenges. In this way, the human authentication platform may use the same human authentication challenge for multiple users and gather input data from multiple users. By reusing the same human authentication challenge, the human authentication platform may conserve computing resources (e.g., processing resources, memory resources, and/or the like) that would have otherwise been used to generate a new human authentication challenge.

The human authentication platform may generate a variety of human authentication challenges using the animation. In some implementations, the human authentication platform may use the animation to generate other images for the human authentication platform. For example, the human authentication platform may use style transfer algorithms to impose different artistic styles onto a first animation to generate a second animation. For example, the human authentication platform may use a style transfer algorithm to change the style of a realistic animation to a non-realistic animation, a semi-realistic animation, an animation mimicking the style of a particular art movement or artist (e.g., Van Gogh, Picasso, cubism, and/or the like), and/or the like. The human authentication platform may then use the second animation in the human authentication challenge or a future human authentication challenge.

In some implementations, the human authentication platform may perform style transfer algorithms on all obtained images and store the new images instead of the originally obtained images (e.g., images obtained through web crawling in FIG. 1A). In this way, the human authentication platform may create an image repository of new images to use to generate a human authentication challenge, thereby reducing or eliminating the likelihood that an image in the human authentication challenge has been used or analyzed by other devices. This may increase the security of the human authentication challenge because automated software programs may have been unable to train on the new images.

Figure 1D:
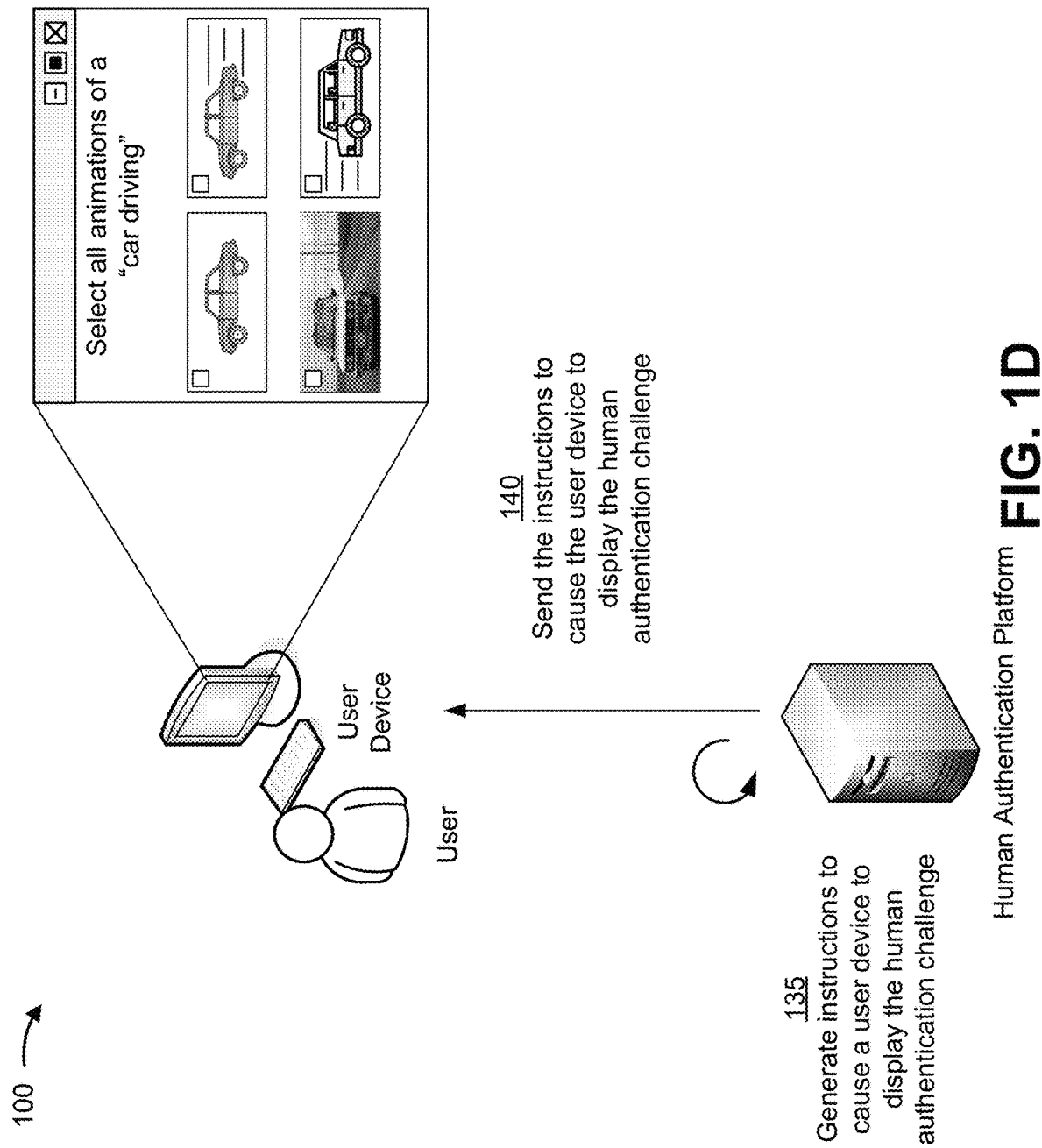

As shown in FIG. 1D, and by reference number 135, the human authentication platform may generate instructions to cause the user device to display the human authentication challenge. The instructions may include additional information or data, such as the animation to be displayed in the human authentication challenge, or instructions for the user device to obtain the animation from a storage location, such as the image repository. The instructions may vary depending on what type of user device is receiving the instructions (e.g., a mobile device, a smart device, a computer, and/or the like).

As shown in FIG. 1D, and by reference number 140, the human authentication platform may send the instructions to cause the user device to display the human authentication challenge. The human authentication platform may send the instructions to the user device, to a server device related to the service the user is attempting to access, to a human authentication challenge service running on a website being served by the server device, and/or the like. In some implementations, the human authentication platform may send the instructions using a signal communication protocol, an application programing interface (API), and/or the like.

Figure 1E:
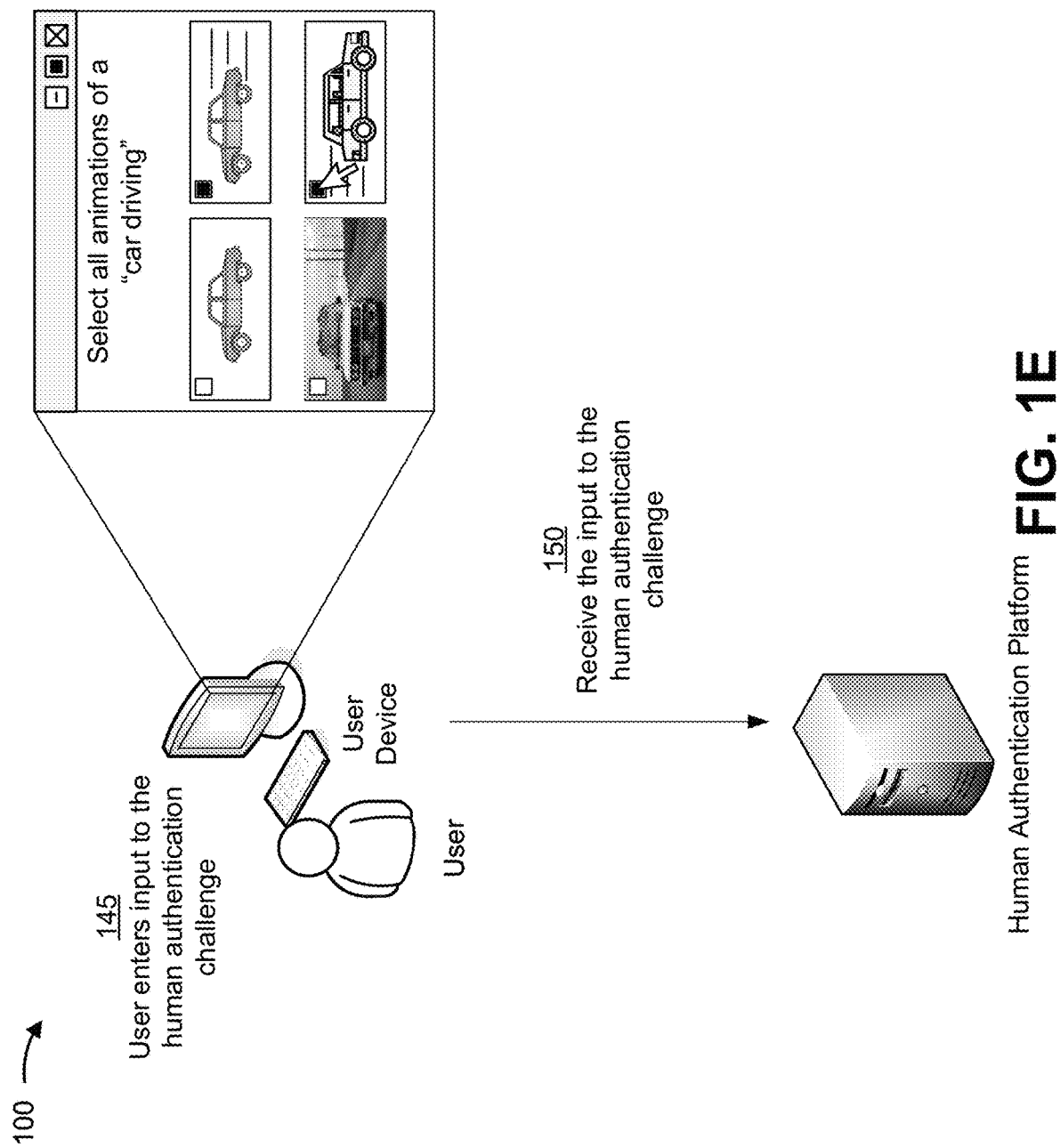

As shown in FIG. 1E, and by reference number 145, the user may provide input for the human authentication challenge. The input may vary based on a type of human authentication challenge that is presented to the user. For example, in a human authentication challenge directing the user to describe an action or future action occurring in the animation, the user may input a string of text, words, letters, numbers, and/or the like as input for the human authentication challenge. In some implementations, the user may select one or more images displayed by the user device from a plurality of images (e.g., in a human authentication challenge where the user is directed to select one or more animations matching the label). The input identified above is intended merely as examples of input that might be used. In practice, different input may be used in addition to, or instead of, the input identified above.

As shown in FIG. 1E, and by reference number 150, the human authentication platform may receive the input for the human authentication challenge. In some implementations, the human authentication platform may receive additional information from the user device pertaining to the human authentication challenge. For example, the human authentication platform may receive timing information, such as a time that it took for the user to complete the human authentication challenge, a time at which the user completed the human authentication challenge, and/or the like. In some implementations, the human authentication platform may receive information related to attempts related to the user and/or user device. For example, the human authentication platform may receive information related to a number of attempts by the user and/or user device in a particular period of time. In this way, the human authentication platform may obtain additional information to help distinguish between human input and machine input. This additional information may be used to update the human authentication model described above, which may improve an accuracy of results of the human authentication model.

Figure 1F:
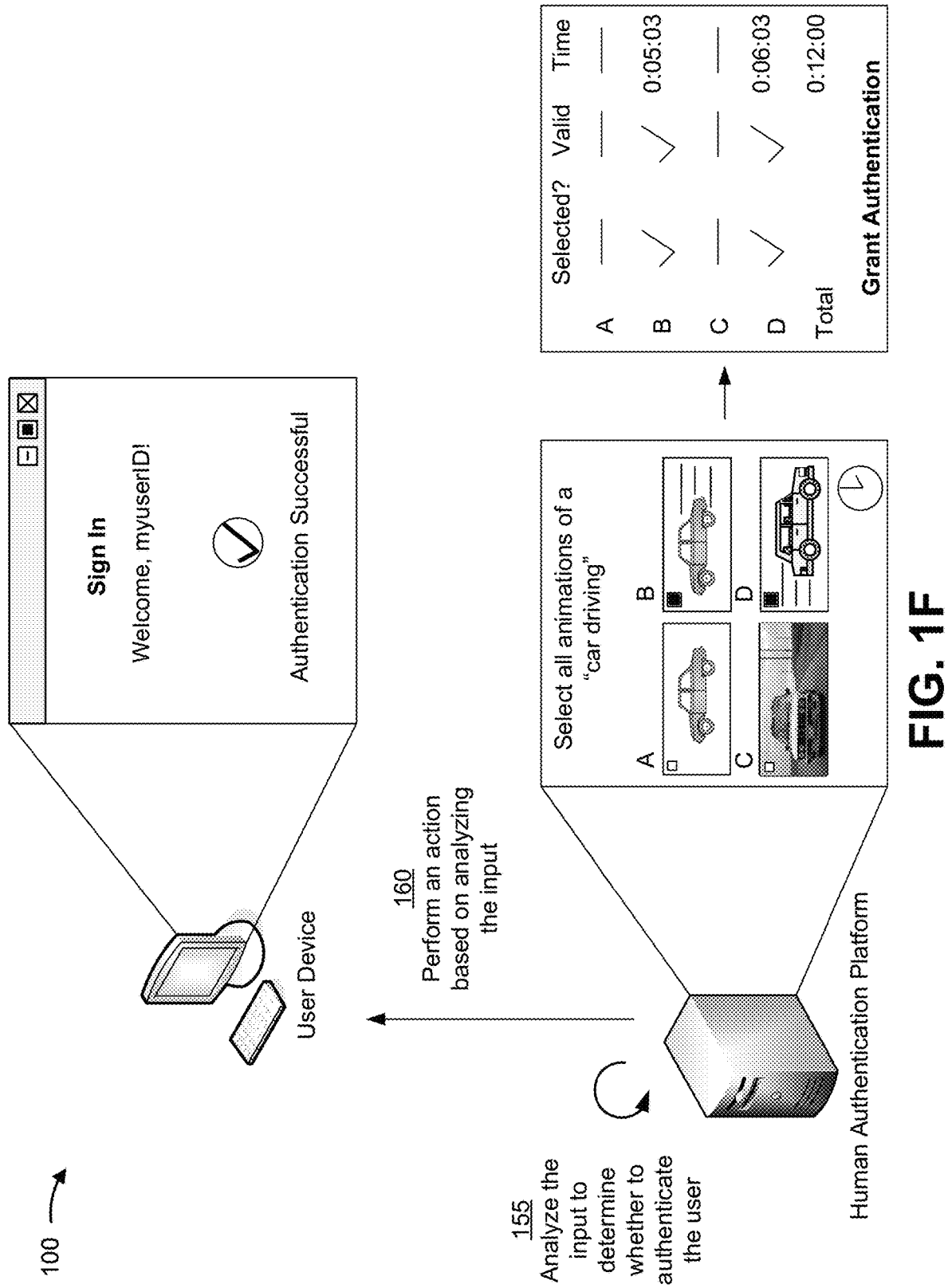

As shown in FIG. 1F, and by reference number 155, the human authentication platform may analyze the input to determine whether to authenticate the user. The human authentication platform may determine whether the input is machine input, human input, and/or the like, and authenticate the user based on determining that the input is human input. In some implementations, the human authentication platform may determine there is not enough information to determine whether to authenticate or not authenticate the user.

The human authentication platform may analyze a variety of input characteristics to determine whether to authenticate the user, such as the input, timing related to the input, a number of attempts related to the input, and/or the like. In a human authentication challenge presenting a plurality of images and directing the user to select one or more animations from the plurality of images, the human authentication platform may analyze the input based on which images were selected by the user, such as whether a static image was selected by the user, what types of animations were selected by the user, and/or the like. In a human authentication challenge directing the user to interpret an action or future action in the animation, the human authentication challenge may compare the input to the label associated with the animation. If the input matches (e.g., exactly matches or substantially matches) the label, the human authentication platform may determine to authenticate the user. In some implementations, the human authentication platform may analyze the additional information, such as the timing information (e.g., time that it took for the user to complete the human authentication challenge, time it took for the user to select a particular image, and/or the like), to determine whether to authenticate the user. For example, the human authentication platform may determine to authenticate the user based on whether the input involves selecting an animation before it has loaded.

In some implementations, the human authentication platform may analyze the user characteristics (e.g., what type of user device is being used, whether the user device is a trusted device, how many times the user has attempted to access the service, and/or the like) in addition to the input characteristics (e.g., characteristics related to answering the human authentication challenge) to determine whether to authenticate the user. For example, the human authentication platform may calculate a security risk score associated with analyzing the user characteristics and the input characteristics and then determine whether the security risk score satisfies a particular threshold in a manner similar to what is discussed with regard to FIG. 1B.

In some implementations, the human authentication platform may use artificial intelligence techniques, such as machine learning, deep learning, and/or the like to determine whether to authenticate the user. For example, the human authentication platform may train an authentication decision model to identify particular input characteristics and/or user characteristics that share attributes with particular outcomes (e.g., authenticating the user, not authenticating the user, and/or the like) and establish a cluster (e.g., using a mapping, index, and/or the like) of the particular input characteristics and/or user characteristics. The human authentication platform may use a clustering algorithm (e.g., a K-means clustering algorithm, a hierarchical clustering algorithm, a DBSCAN algorithm, a Gaussian clustering model, etc.), or a combination of different clustering algorithms to form the input characteristics and/or user characteristics clusters. The human authentication platform may train the authentication decision model using historical data associated with historical access data. For example, the machine learning model may be trained based on historical user access data (e.g., the input characteristics and/or the user characteristics) and outcomes and the trained model may then be used to determine whether to authenticate the user based on the characteristics of the user and/or the input attempting to access the service.

As shown in FIG. 1F, and by reference number 160, the human authentication platform may perform an action based on analyzing the input. In some implementations, the human authentication platform may notify the user of successful or unsuccessful authentication. For example, the human authentication platform may send instructions to the user device to display a message indicating that authentication has been successful or unsuccessful. In some implementations, the human authentication platform may send instructions to grant or deny access to the service the user is attempting to access. In some implementations, the human authentication platform may perform an action based on being unable to determine whether to authenticate the user. For example, the human authentication platform may generate a second human authentication challenge and send instructions to display the second human authentication challenge to the user device. Additionally, or alternatively, the human authentication platform may send instructions to notify the user to attempt to access the service at another time.

In some implementations, the human authentication platform may save the input characteristics and/or the user characteristics. The human authentication platform may use the input characteristics and/or the user characteristics to further develop the human authentication platform using artificial intelligence techniques, such as machine learning, deep learning, and/or the like. For example, the human authentication platform may use the input characteristics and/or the user characteristics to update a machine learning model, such as described above. In some implementations, the human authentication platform may store the input characteristics and/or the user characteristics to help associate particular characteristics with the user and thus improve security.

In this way, security associated with a service or application may improve, as potentially harmful attacks may be reduced or mitigated because of a failure to obtain access to the service or application, through failure to complete the human authentication challenge. In turn, this may conserve computing resources (e.g., processor resources, memory resources, communication resources, and/or the like) that would otherwise be used in identifying, investigating, and/or remediating a security breach. For example, computing resources that otherwise may have been used in executing processes to identify a cause of the security breach may no longer be used due to the reduction or elimination of security breaches. Additionally, or alternatively, memory resources that may have been used in recovering data, processing resources that may have been used in updating a computer system associated with the service or application because of the breaches, and/or the like may be conserved because of the reduction or elimination of security breaches.

As indicated above, FIGS. 1A-1F are provided as one or more examples. Other examples may differ from what is described with regard to FIGS. 1A-1F.

Figure 2:
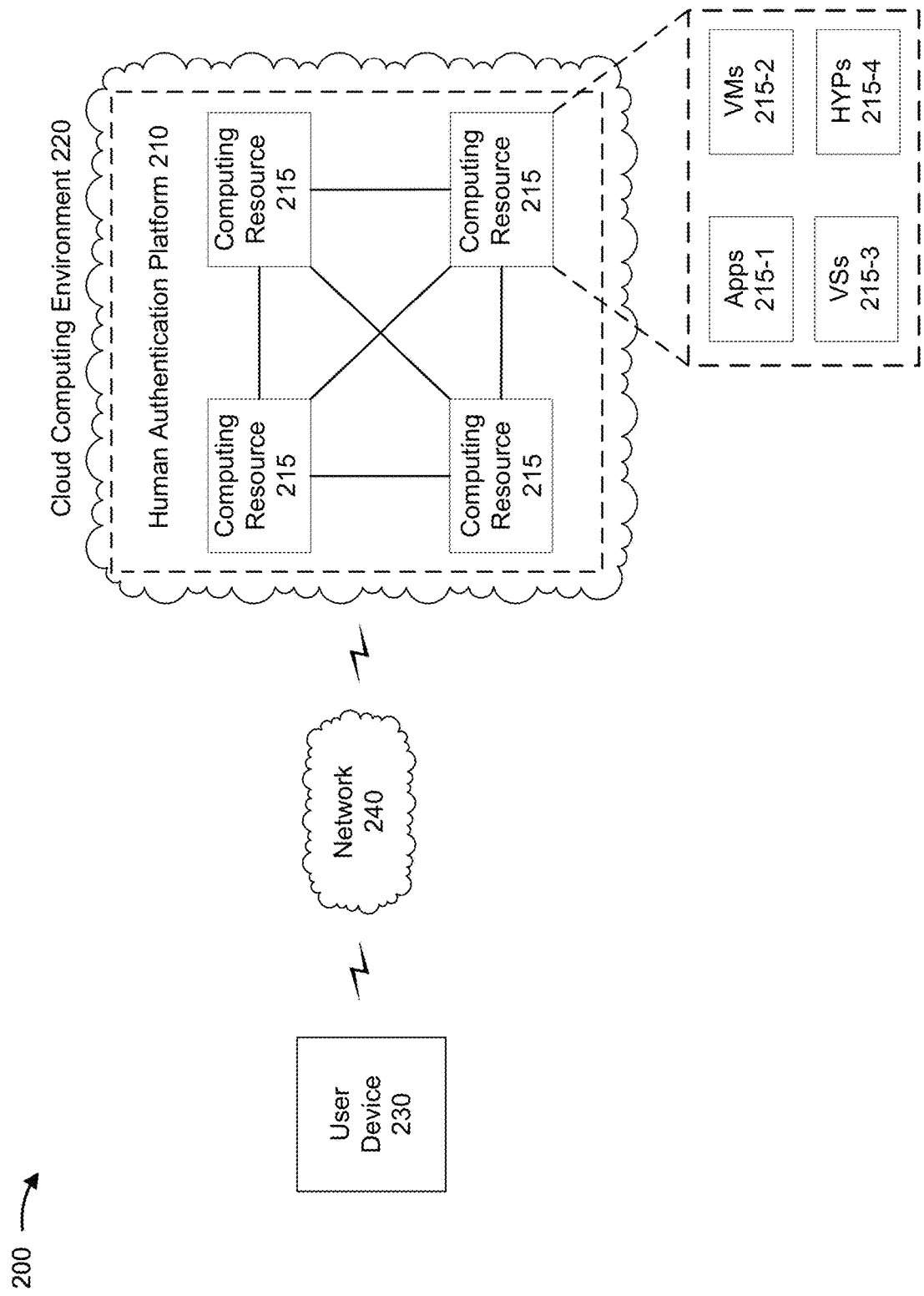
FIG. 2 is a diagram of an example environment in which systems and/or methods described herein may be implemented.

FIG. 2 is a diagram of an example environment 200 in which systems and/or methods, described herein, may be implemented. As shown in FIG. 2, environment 200 may include a human authentication platform 210, a cloud computing environment 220, a user device 230, and a network 240. Devices of environment 200 may interconnect via wired connections, wireless connections, or a combination of wired and wireless connections.

Human authentication platform 210 includes one or more devices capable of sending, receiving, generating, storing, processing, and/or providing information associated with a human authentication challenge that distinguishes human input from machine input. For example, human authentication platform 210 may be a platform implemented by cloud computing environment 220 that may generate, send, receive, and/or validate human authentication challenges for distinguishing human input from machine input. In some implementations, human authentication platform 210 is implemented by computing resources 215 of cloud computing environment 220.

While the example environment 200 indicates that human authentication platform 210 is implemented in a cloud computing environment 220, in some implementations, human authentication platform 210 may be implemented by one or more devices outside of a cloud computing environment, such as a server device, a data center device, and/or the like. In some implementations, human authentication platform 210 may be implemented using at least one cloud-based device and at least one non-cloud-based device.

Cloud computing environment 220 includes an environment that delivers computing as a service, whereby shared resources, services, etc. may be provided to human authentication platform 210 for distinguishing human input from machine input. Cloud computing environment 220 may provide computation, software, data access, storage, and/or other services that do not require end-user knowledge of a physical location and configuration of a system and/or a device that delivers the services. As shown, cloud computing environment 220 may include human authentication platform 210 and computing resources 215.

Computing resource 215 includes one or more personal computers, workstation computers, server devices, or another type of computation and/or communication device. In some implementations, computing resource 215 may host human authentication platform 210. The cloud resources may include compute instances executing in computing resource 245, storage devices provided in computing resource 215, data transfer devices provided by computing resource 215, etc. In some implementations, computing resource 215 may communicate with other computing resources 215 via wired connections, wireless connections, or a combination of wired and wireless connections.

As further shown in FIG. 2, computing resource 215 may include a group of cloud resources, such as one or more applications ("APPs") 215-1, one or more virtual machines ("VMs") 215-2, virtualized storage ("VSs") 215-3, one or more hypervisors ("HYPs") 215-4, or the like.

Application 215-1 includes one or more software applications that may be provided to or accessed by user device 230. Application 215-1 may eliminate a need to install and execute the software applications on user device 230, and/or the like. For example, application 215-1 may include software associated with human authentication platform 210 and/or any other software capable of being provided via cloud computing environment 220. In some implementations, one application 215-1 may send/receive information to/from one or more other applications 215-1, via virtual machine 215-2.

Virtual machine 215-2 includes a software implementation of a machine (e.g., a computer) that executes programs like a physical machine. Virtual machine 215-2 may be either a system virtual machine or a process virtual machine, depending upon use and degree of correspondence to any real machine by virtual machine 215-2. A system virtual machine may provide a complete system platform that supports execution of a complete operating system ("OS"). A process virtual machine may execute a single program, and may support a single process. In some implementations, virtual machine 215-2 may execute on behalf of a user (e.g., user device 230, etc.), and may manage infrastructure of cloud computing environment 220, such as data management, synchronization, or long-duration data transfers.

Virtualized storage 215-3 includes one or more storage systems and/or one or more devices that use virtualization techniques within the storage systems or devices of computing resource 215. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 215-4 provides hardware virtualization techniques that allow multiple operating systems (e.g., "guest operating systems") to execute concurrently on a host computer, such as computing resource 215. Hypervisor 215-4 may present a virtual operating platform to the guest operating systems, and may manage the execution of the guest operating systems. Multiple instances of a variety of operating systems may share virtualized hardware resources.

User device 230 includes one or more devices capable of sending, receiving, generating, storing, processing, and/or providing information associated with a human authentication challenge that distinguishes human input from machine input. For example, user device 230 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device.

Network 240 includes one or more wired and/or wireless networks. For example, network 240 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
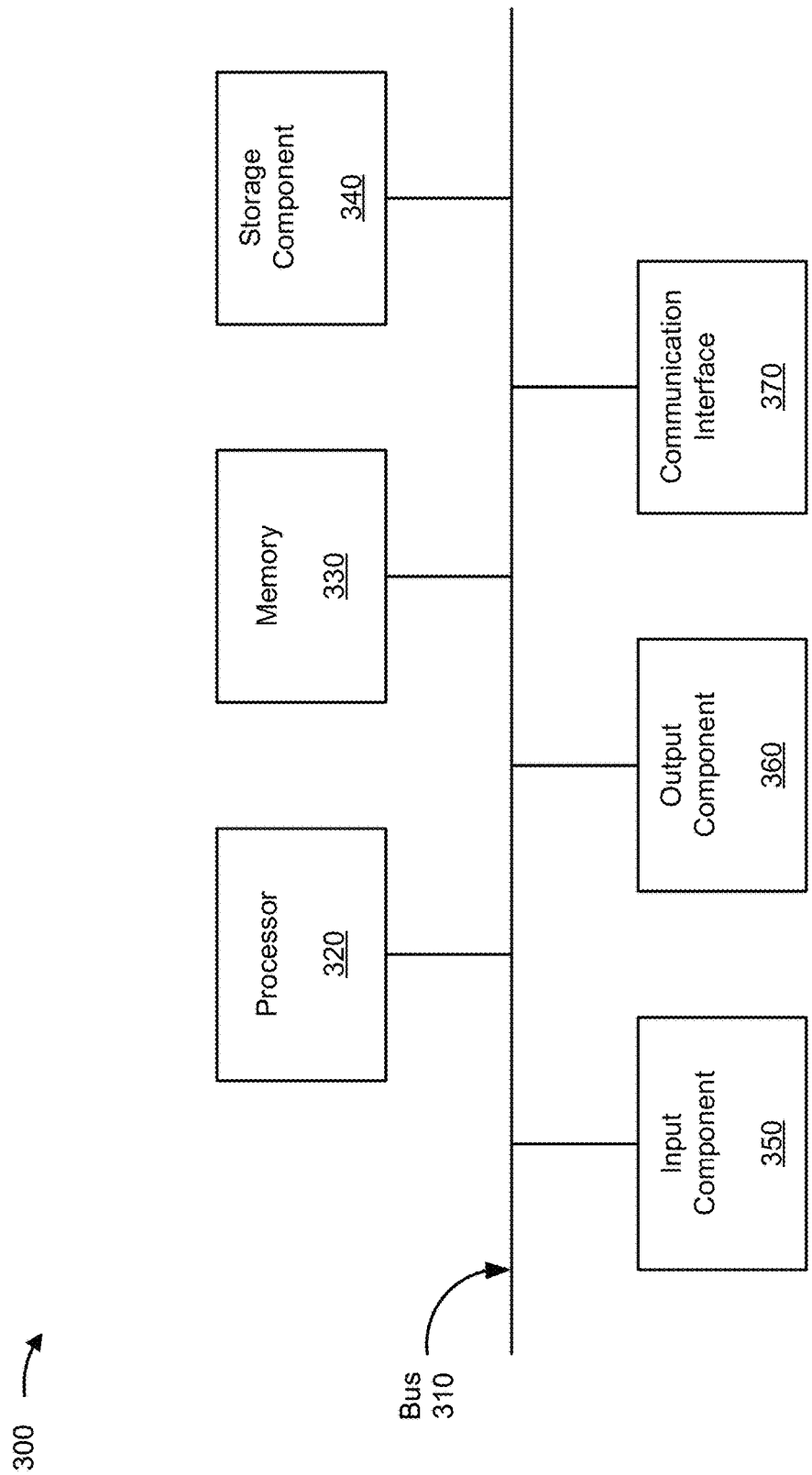
FIG. 3 is a diagram of example components of one or more devices of FIG. 2.

FIG. 3 is a diagram of example components of a device 300. Device 300 may correspond to human authentication platform 210, user device 230, and/or computing resource 215. In some implementations, human authentication platform 210, user device 230, and/or computing resource 215 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
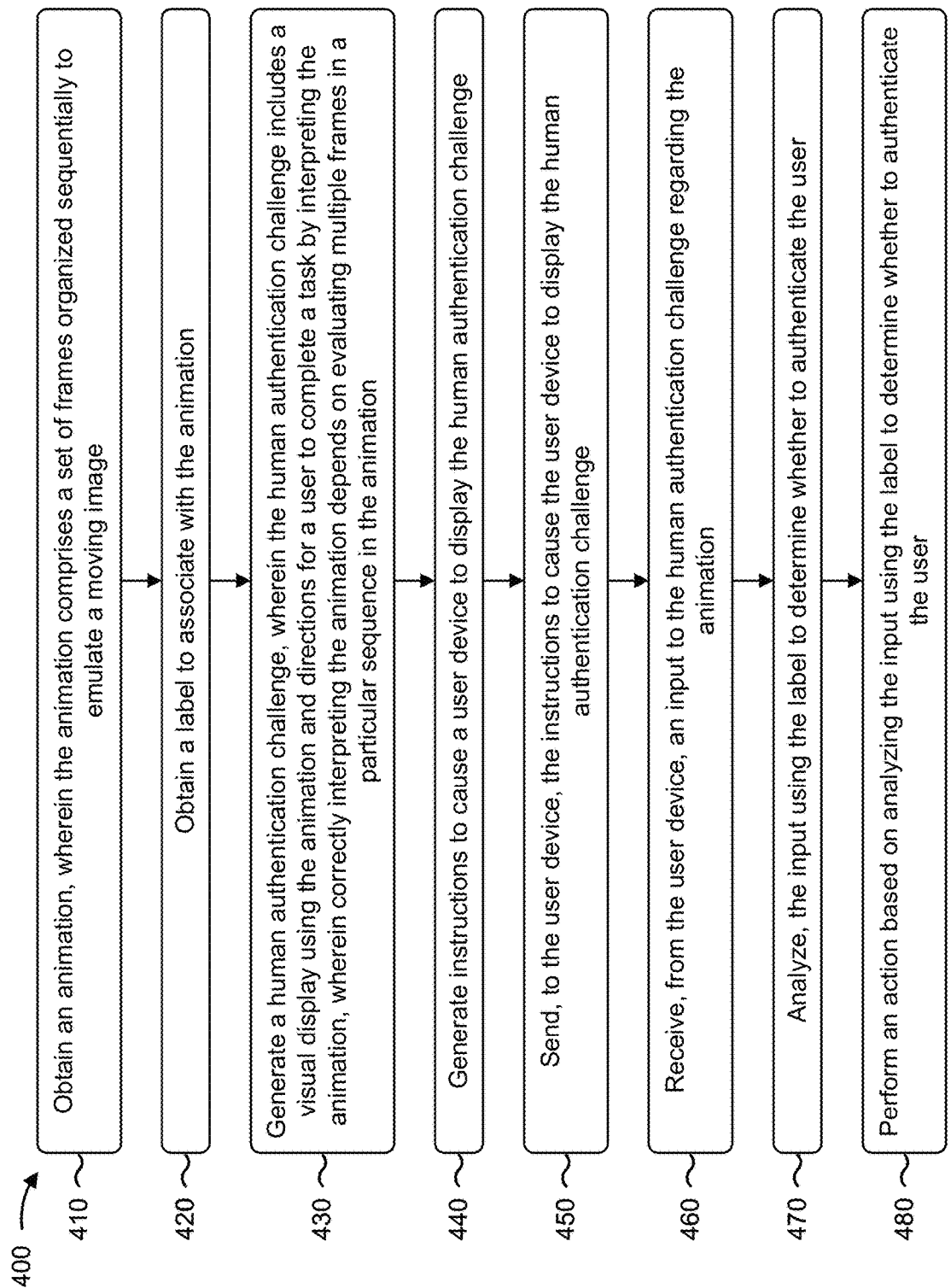
FIG. 4 is a flowchart of an example process for distinguishing human from machine input using an animation.

FIG. 4 is a flow chart of an example process 400 for distinguishing human from machine input using an animation. In some implementations, one or more process blocks of FIG. 4 may be performed by a device (e.g., human authentication platform 210). In some implementations, one or more process blocks of FIG. 4 may be performed by another device or a group of devices separate from or including the device, such as a user device (e.g., user device 230), and/or the like.

As shown in FIG. 4, process 400 may include obtaining an animation, wherein the animation comprises a set of frames organized sequentially to emulate a moving image (block 410). For example, the device (e.g., using computing resource 215, processor 320, memory 330, storage component 340, input component 350, output component 360, communication interface 370, and/or the like) may obtain an animation, as described above. In some implementations, the animation comprises a set of frames organized sequentially to emulate a moving image.

As further shown in FIG. 4, process 400 may include obtaining a label to associate with the animation (block 420). For example, the device (e.g., using computing resource 215, processor 320, memory 330, storage component 340, input component 350, output component 360, communication interface 370, and/or the like) may obtain a label to associate with the animation, as described above.

As further shown in FIG. 4, process 400 may include generating a human authentication challenge, wherein the human authentication challenge includes a visual display using the animation and directions for a user to complete a task by interpreting the animation, wherein correctly interpreting the animation depends on evaluating multiple frames in a particular sequence in the animation (block 430). For example, the device (e.g., using computing resource 215, processor 320, memory 330, storage component 340, input component 350, output component 360, communication interface 370, and/or the like) may generate a human authentication challenge, as described above. In some implementations, the human authentication challenge includes a visual display using the animation and directions for a user to complete a task by interpreting the animation. In some implementations, correctly interpreting the animation depends on evaluating multiple frames in a particular sequence in the animation.

As further shown in FIG. 4, process 400 may include generating instructions to cause a user device to display the human authentication challenge (block 440). For example, the device (e.g., using computing resource 215, processor 320, memory 330, storage component 340, input component 350, output component 360, communication interface 370, and/or the like) may generate instructions to cause a user device to display the human authentication challenge, as described above.

As further shown in FIG. 4, process 400 may include sending, to the user device, the instructions to cause the user device to display the human authentication challenge (block 450). For example, the device (e.g., using computing resource 215, processor 320, memory 330, storage component 340, input component 350, output component 360, communication interface 370, and/or the like) may send, to the user device, the instructions to cause the user device to display the human authentication challenge, as described above.

As further shown in FIG. 4, process 400 may include receiving, from the user device, an input to the human authentication challenge regarding the animation (block 460). For example, the device (e.g., using computing resource 215, processor 320, memory 330, storage component 340, input component 350, output component 360, communication interface 370, and/or the like) may receive, from the user device, an input to the human authentication challenge regarding the animation, as described above.

As further shown in FIG. 4, process 400 may include analyzing the input using the label to determine whether to authenticate the user (block 470). For example, the device (e.g., using computing resource 215, processor 320, memory 330, storage component 340, input component 350, output component 360, communication interface 370, and/or the like) may analyze the input using the label to determine whether to authenticate the user, as described above.

As further shown in FIG. 4, process 400 may include performing an action based on analyzing the input using the label to determine whether to authenticate the user (block 480). For example, the device (e.g., using computing resource 215, processor 320, memory 330, storage component 340, input component 350, output component 360, communication interface 370, and/or the like) may perform an action based on analyzing the input using the label to determine whether to authenticate the user, as described above.

Process 400 may include additional implementations, such as any single implementation or any combination of implementations described below and/or in connection with one or more other processes described elsewhere herein.

In a first implementation, obtaining the label to associate with the animation may comprise one or more of: obtaining the label from user input, or generating the label using a machine learning algorithm.

In a second implementation, alone or in combination with the first implementation, the directions for the user to complete the task by interpreting the animation may comprise directions for the user to predict a next set of frames to fit the animation based on interpreting the animation.

In a third implementation, alone or in combination with one or more of the first and second implementations, the human authentication challenge may comprise presenting, for display, the animation in a set of two or more visual images, presenting the label for display in connection with the animation, and directing the user to interpret each visual image, of the set of two or more visual images and the label, and select each visual image, of the set of two or more visual images that corresponds to the label.

In a fourth implementation, alone or in combination with one or more of the first through third implementations, generating the instructions may comprise generating the instructions based on a type of user device and varying one or more of: a quality of the visual display based on the type of user device, or a type of the visual display based on the type of user device.

In a fifth implementation, alone or in combination with one or more of the first through fourth implementations, the input to the human authentication challenge may comprise one or more of: a user-inputted response to the human authentication challenge or timing information associated with the user-inputted response to the human authentication challenge.

In a sixth implementation, alone or in combination with one or more of the first through fifth implementations, analyzing the input may comprise determining whether the input was entered by a human or a machine.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
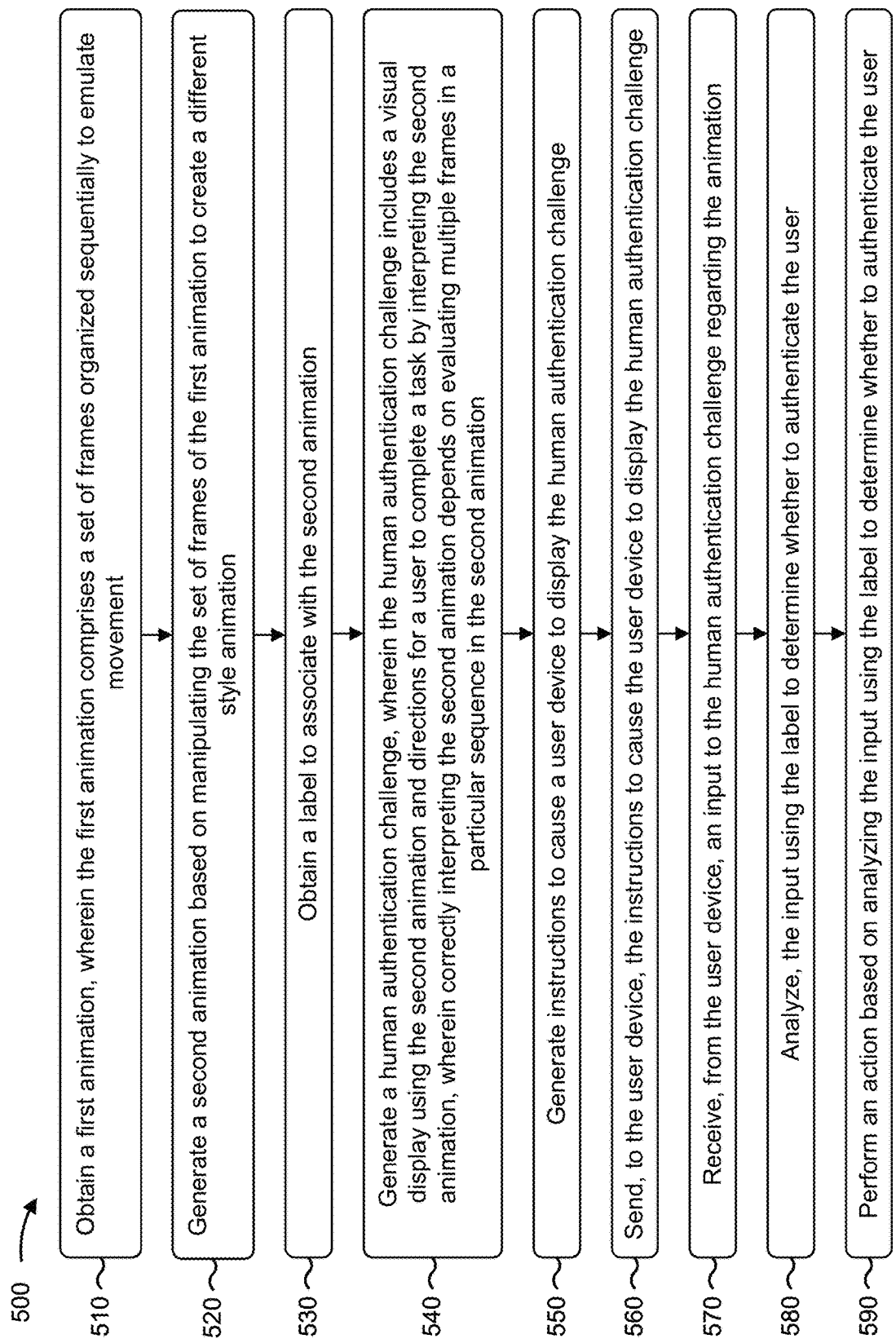
FIG. 5 is a flowchart of an example process for distinguishing human from machine input using an animation.

FIG. 5 is a flow chart of an example process 500 for distinguishing human from machine input using an animation. In some implementations, one or more process blocks of FIG. 5 may be performed by a device (e.g., human authentication platform 210). In some implementations, one or more process blocks of FIG. 5 may be performed by another device or a group of devices separate from or including the device, such as a user device (e.g., user device 230) and/or the like.

As shown in FIG. 5, process 500 may include obtaining a first animation, wherein the first animation comprises a series of images organized sequentially to emulate movement (block 510). For example, the device (e.g., using computing resource 215, processor 320, memory 330, storage component 340, input component 350, output component 360, communication interface 370, and/or the like) may obtain a first animation, as described above. In some implementations, the first animation comprises a series of images that simulates movement.

As further shown in FIG. 5, process 500 may include generating a second animation based on manipulating the series of images of the first animation to create a different style animation (block 520). For example, the device (e.g., using computing resource 215, processor 320, memory 330, storage component 340, input component 350, output component 360, communication interface 370, and/or the like) may generate a second animation based on manipulating the series of images of the first animation to create a different style animation, as described above.

As further shown in FIG. 5, process 500 may include obtaining a label to associate with the second animation (block 530). For example, the device (e.g., using computing resource 215, processor 320, memory 330, storage component 340, input component 350, output component 360, communication interface 370, and/or the like) may obtain a label to associate with the second animation, as described above.

As further shown in FIG. 5, process 500 may include generating a human authentication challenge, wherein the human authentication challenge includes a visual display using the second animation, and directions for a user to complete a task by interpreting the second animation and wherein correctly interpreting the second animation depends on evaluating multiple images in a particular sequence in the second animation (block 540). For example, the device (e.g., using computing resource 215, processor 320, memory 330, storage component 340, input component 350, output component 360, communication interface 370, and/or the like) may generate a human authentication challenge, as described above. In some implementations, the human authentication challenge includes a visual display using the second animation and directions for a user to complete a task by interpreting the second animation. In some implementations, correctly interpreting the second animation depends on evaluating multiple frames in a particular sequence in the second animation.

As further shown in FIG. 5, process 500 may include generating instructions to cause a user device to display the human authentication challenge (block 550). For example, the device (e.g., using computing resource 215, processor 320, memory 330, storage component 340, input component 350, output component 360, communication interface 370, and/or the like) may generate instructions to cause a user device to display the human authentication challenge, as described above.

As further shown in FIG. 5, process 500 may include sending, to the user device, the instructions to cause the user device to display the human authentication challenge (block 560). For example, the device (e.g., using computing resource 215, processor 320, memory 330, storage component 340, input component 350, output component 360, communication interface 370, and/or the like) may send, to the user device, the instructions to cause the user device to display the human authentication challenge, as described above.

As further shown in FIG. 5, process 500 may include receiving, from the user device, an input to the human authentication challenge regarding the second animation (block 570). For example, the device (e.g., using computing resource 215, processor 320, memory 330, storage component 340, input component 350, output component 360, communication interface 370, and/or the like) may receive, from the user device, an input to the human authentication challenge regarding the second animation, as described above.

As further shown in FIG. 5, process 500 may include analyzing the input using the label to determine whether to authenticate the user (block 580). For example, the device (e.g., using computing resource 215, processor 320, memory 330, storage component 340, input component 350, output component 360, communication interface 370, and/or the like) may analyze the input using the label to determine whether to authenticate the user, as described above.

As further shown in FIG. 5, process 500 may include performing an action based on analyzing the input using the label to determine whether to authenticate the user (block 590). For example, the device (e.g., using computing resource 215, processor 320, memory 330, storage component 340, input component 350, output component 360, communication interface 370, and/or the like) may perform an action based on analyzing the input using the label to determine whether to authenticate the user, as described above.

Process 500 may include additional implementations, such as any single implementation or any combination of implementations described below and/or in connection with one or more other processes described elsewhere herein.

In a first implementation, process 500, when generating the human authentication challenge, may include generating a visual display of the second animation and direct the user to input a string of text corresponding to an interpretation of the second animation.

In a second implementation, alone or in combination with the first implementation, process 500, when generating the second animation, may include using a neural style transfer algorithm to generate the second animation from the first animation.

In a third implementation, alone or in combination with one or more of the first and second implementations, the human authentication challenge may comprise a Completely Automated Public Turing test to tell Computers and Humans Apart.

In a fourth implementation, alone or in combination with one or more of the first through third implementations, process 500, when performing the action, may include performing a first action when determining that the user is authenticated or performing a second action when determining that the user is not authenticated, where the second action is different from the first action.

In a fifth implementation, alone or in combination with one or more of the first through fourth implementations, process 500, when performing the action, may include generating another human authentication challenge to send to the user device based on determining that the user is not authenticated.

In a sixth implementation, alone or in combination with one or more of the first through fifth implementations, process 500, when analyzing the input, may include determining whether the input is from a human, determining whether the input is from a machine, or determining that it is inconclusive whether the input is from a human or from a machine.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
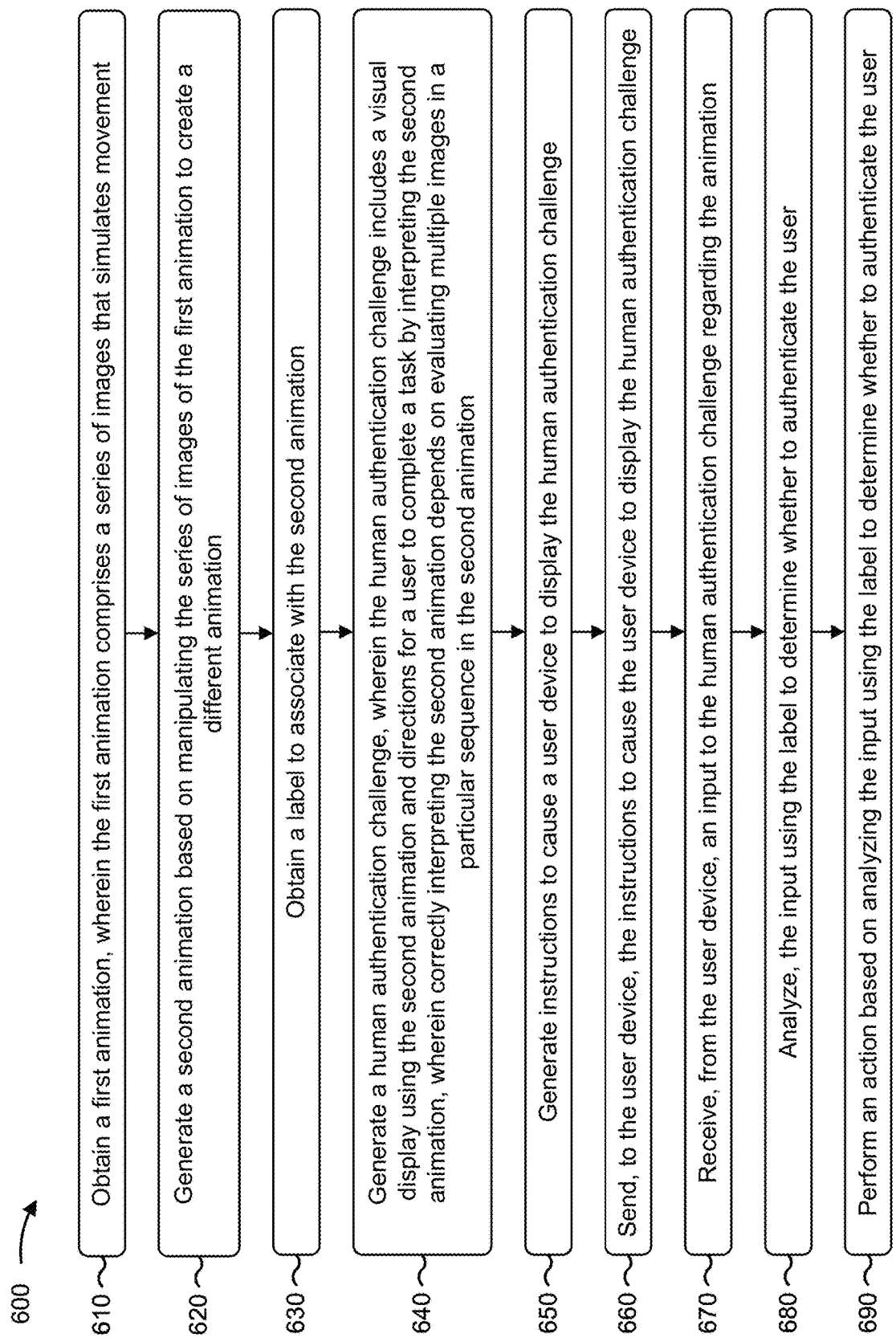
FIG. 6 is a flowchart of an example process for distinguishing human from machine input using an animation.

FIG. 6 is a flow chart of an example process 600 for distinguishing human from machine input using an animation. In some implementations, one or more process blocks of FIG. 6 may be performed by a device (e.g., human authentication platform 210). In some implementations, one or more process blocks of FIG. 6 may be performed by another device or a group of devices separate from or including the device, such as a user device (e.g., user device 230), and/or the like.

As shown in FIG. 6, process 600 may include obtaining a first animation wherein the first animation comprises a series of images that simulates movement (block 610). For example, the device (e.g., using computing resource 215, processor 320, memory 330, storage component 340, input component 350, output component 360, communication interface 370, and/or the like) may obtain a first animation, as described above. In some implementations, the first animation comprises a series of images that simulates movement.

As further shown in FIG. 6, process 600 may include generating a second animation based on manipulating the series of images of the first animation to create a different animation (block 620). For example, the device (e.g., using computing resource 215, processor 320, memory 330, storage component 340, input component 350, output component 360, communication interface 370, and/or the like) may generate a second animation based on manipulating the series of images of the first animation to create a different animation, as described above.

As further shown in FIG. 6, process 600 may include obtaining a label to associate with the second animation (block 630). For example, the device (e.g., using computing resource 215, processor 320, memory 330, storage component 340, input component 350, output component 360, communication interface 370, and/or the like) may obtain a label to associate with the second animation, as described above.

As further shown in FIG. 6, process 600 may include generating a human authentication challenge, wherein the human authentication challenge includes a visual display using the second animation, and directions for a user to complete a task by interpreting the second animation and wherein correctly interpreting the second animation depends on evaluating multiple images in a particular sequence in the second animation (block 640). For example, the device (e.g., using computing resource 215, processor 320, memory 330, storage component 340, input component 350, output component 360, communication interface 370, and/or the like) may generate a human authentication challenge, as described above. In some implementations, the human authentication challenge includes a visual display using the second animation and directions for a user to complete a task by interpreting the second animation. In some implementations, correctly interpreting the second animation depends on evaluating multiple images in a particular sequence in the second animation.

As further shown in FIG. 6, process 600 may include generating instructions to cause a user device to display the human authentication challenge (block 650). For example, the device (e.g., using computing resource 215, processor 320, memory 330, storage component 340, input component 350, output component 360, communication interface 370, and/or the like) may generate instructions to cause a user device to display the human authentication challenge, as described above.

As further shown in FIG. 6, process 600 may include sending, to the user device, the instructions to cause the user device to display the human authentication challenge (block 660). For example, the device (e.g., using computing resource 215, processor 320, memory 330, storage component 340, input component 350, output component 360, communication interface 370, and/or the like) may send, to the user device, the instructions to cause the user device to display the human authentication challenge, as described above.

As further shown in FIG. 6, process 600 may include receiving, from the user device, an input to the human authentication challenge regarding the second animation (block 670). For example, the device (e.g., using computing resource 215, processor 320, memory 330, storage component 340, input component 350, output component 360, communication interface 370, and/or the like) may receive, from the user device, an input to the human authentication challenge regarding the second animation, as described above.

As further shown in FIG. 6, process 600 may include analyze the input using the label to determine whether to authenticate the user (block 680). For example, the device (e.g., using computing resource 215, processor 320, memory 330, storage component 340, input component 350, output component 360, communication interface 370, and/or the like) may analyze the input using the label to determine whether to authenticate the user, as described above.

As further shown in FIG. 6, process 600 may include performing an action based on analyzing the input using the label to determine whether to authenticate the user (block 690). For example, the device (e.g., using computing resource 215, processor 320, memory 330, storage component 340, input component 350, output component 360, communication interface 370, and/or the like) may perform an action based on analyzing the input using the label to determine whether to authenticate the user, as described above.

Process 600 may include additional implementations, such as any single implementation or any combination of implementations described below and/or in connection with one or more other processes described elsewhere herein.

In a first implementation, process 600 may further include storing the input to create one or more other labels to associate with the second animation.

In a second implementation, alone or in combination with the first implementation, process 600 may include providing access to a service provided by a server device based on determining that the user is authenticated, or denying access to the service provided by the server device based on determining that the user is not authenticated.

In a third implementation, alone or in combination with one or more of the first and second implementations, the visual display using the second animation may comprise one or more static images displayed with the second animation.

In a fourth implementation, alone or in combination with one or more of the first through third implementations, process 600, when generating the instructions to cause the user device to display the human authentication challenge, may include varying a quality of the second animation through one or more of: a size of the second animation or a type of the second animation.

In a fifth implementation, alone or in combination with one or more of the first through fourth implementations, the input to the human authentication challenge may comprise timing information that includes one or more of: information associated with a time taken to complete the human authentication challenge, or information associated with a frequency at which the user device has completed a set of human authentication challenges.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
obtaining, by a device, an animation,
    wherein the animation comprises a set of frames organized sequentially to emulate a moving image;
generating, by the device and using a machine learning algorithm, a label to associate with the animation,
    wherein the machine learning algorithm generates the label based on information associated with the animation;
generating, by the device, a human authentication challenge, wherein the human authentication challenge includes:
a visual display using the animation, and
directions for a user to complete a task by interpreting the animation, wherein correctly interpreting the animation depends on evaluating multiple frames in a particular sequence in the animation;
generating, by the device, instructions to cause a user device to display the human authentication challenge;
sending, by the device and to the user device, the instructions to cause the user device to display the human authentication challenge;
receiving, by the device and from the user device, an input to the human authentication challenge regarding the animation,
wherein the input is a string of text associated with interpreting the animation,
wherein the string of text describes one of:
a particular action shown in the animation, or
a predicted action that is not shown in the animation based on interpreting the animation;
analyzing, by the device, the input using the label to determine whether to authenticate the user; and
performing, by the device, an action based on analyzing the input using the label to determine whether to authenticate the user.

2. The method of claim 1, wherein the directions for the user to complete the task by interpreting the animation comprises directions for the user to predict a next set of frames to fit the animation based on interpreting the animation.

3. The method of claim 1, wherein the human authentication challenge comprises:
presenting, for display, the animation in a set of two or more visual images,
presenting the label for display in connection with the animation, and
directing the user to:
interpret each visual image, of the set of two or more visual images, and the label, and
select each visual image, of the set of two or more visual images, that corresponds to the label.

4. The method of claim 1, wherein generating the instructions comprises:
generating the instructions based on a type of user device, and
varying one or more of:
a quality of the visual display based on the type of user device, or
a type of the visual display based on the type of user device.

5. The method of claim 1, wherein the input to the human authentication challenge comprises one or more of:
a user-inputted response to the human authentication challenge, or
timing information associated with the user-inputted response to the human authentication challenge.

6. The method of claim 1, wherein analyzing the input comprises determining whether the input was entered by a human or a machine.

7. A device, comprising:
one or more memories; and
one or more processors, communicatively coupled to the one or more memories, configured to:
obtain a first animation,
wherein the first animation comprises a set of frames organized sequentially to emulate movement;
generate a second animation based on manipulating the set of frames of the first animation to create a different style animation;
generate, using a machine learning algorithm, a label to associate with the second animation,
wherein the machine learning algorithm generates the label based on information associated with the second animation;
generate a human authentication challenge, wherein the human authentication challenge includes:
a visual display using the second animation, and
directions for a user to complete a task by interpreting the second animation,
wherein correctly interpreting the second animation depends on evaluating multiple frames in a particular sequence in the second animation;
generate instructions to cause a user device to display the human authentication challenge;
send, to the user device, the instructions to cause the user device to display the human authentication challenge;
receive, from the user device, an input to the human authentication challenge regarding the second animation,
wherein the input is a string of text associated with interpreting the second animation,
wherein the string of text describes one of:
a particular action shown in the second animation, or
a predicted action that is not shown in the second animation based on interpreting the second animation;
analyze the input using the label to determine whether to authenticate the user; and
perform an action based on analyzing the input using the label to determine whether to authenticate the user.

8. The device of claim 7, wherein the one or more processors, when generating the second animation, are to use a neural style transfer algorithm to generate the second animation from the first animation.

9. The device of claim 7, wherein the human authentication challenge comprises a Completely Automated Public Turing test to tell Computers and Humans Apart.

10. The device of claim 7, wherein the one or more processors, when performing the action, are to:
perform a first action when determining that the user is authenticated, or
perform a second action when determining that the user is not authenticated,
wherein the second action is different from the first action.

11. The device of claim 7, wherein the one or more processors, when performing the action, are to generate another human authentication challenge to send to the user device based on determining that the user is not authenticated.

12. The device of claim 7, wherein the one or more processors, when analyzing the input, are to:
determine whether the input is from a human,
determine whether the input is from a machine, or
determine that it is inconclusive whether the input is from a human or from a machine.

13. A non-transitory computer-readable medium storing instructions, the instructions comprising:
one or more instructions that, when executed by one or more processors, cause the one or more processors to:
obtain a first animation,
wherein the first animation comprises a series of images that simulates movement;

generate a second animation based on manipulating the series of images of the first animation to create a different animation;
generate, using a machine learning algorithm, a label to associate with the second animation,
    wherein the machine learning algorithm generates the label based on information associated with the second animation;
generate a human authentication challenge, wherein the human authentication challenge includes:
    a visual display using the second animation, and
    directions for a user to complete a task by interpreting the second animation,
        wherein correctly interpreting the second animation depends on evaluating multiple images in a particular sequence in the second animation;
generate instructions to cause a user device to display the human authentication challenge;
send, to the user device, the instructions to cause the user device to display the human authentication challenge;
receive, from the user device, an input to the human authentication challenge regarding the second animation,
    wherein the input is a string of text associated with interpreting the second animation,
        wherein the string of text describes one of:
            a particular action shown in the second animation, or
            a predicted action that is not shown in the second animation based on interpreting the second animation;
    analyze the input using the label to determine whether to authenticate the user; and
    perform an action based on analyzing the input using the label to determine whether to authenticate the user.

14. The non-transitory computer-readable medium of claim 13, wherein the one or more instructions, when executed by the one or more processors, further cause the one or more processors to store the input to create one or more other labels to associate with the second animation.

15. The non-transitory computer-readable medium of claim 13, wherein the one or more instructions, that cause the one or more processors to perform the action, cause the one or more processors to:
    provide access to a service provided by a server device based on determining that the user is authenticated, or
    deny access to the service provided by the server device based on determining that the user is not authenticated.

16. The non-transitory computer-readable medium of claim 13, wherein the visual display using the second animation comprises one or more static images displayed with the second animation.

17. The non-transitory computer-readable medium of claim 13, wherein the one or more instructions, that cause the one or more processors to generate the instructions to cause the user device to display the human authentication challenge, cause the one or more processors to vary a quality of the second animation through one or more of:
    a size of the second animation, or
    a type of the second animation.

18. The non-transitory computer-readable medium of claim 13, wherein the input to the human authentication challenge comprises timing information that includes one or more of:
    information associated with a time taken to complete the human authentication challenge, or
    information associated with a frequency at which the user device has completed a set of human authentication challenges.

19. The method of claim 1, wherein the human authentication challenge comprises a Completely Automated Public Turing test to tell Computers and Humans Apart.

20. The device of claim 7, wherein the one or more processors, when generating the instructions, are to:
    generate the instructions based on a type of user device.

* * * * *